Sept. 30, 1952 G. L. BUMBAUGH 2,612,202
TRACTION DEVICE
Filed Feb. 2, 1949 2 SHEETS—SHEET 1
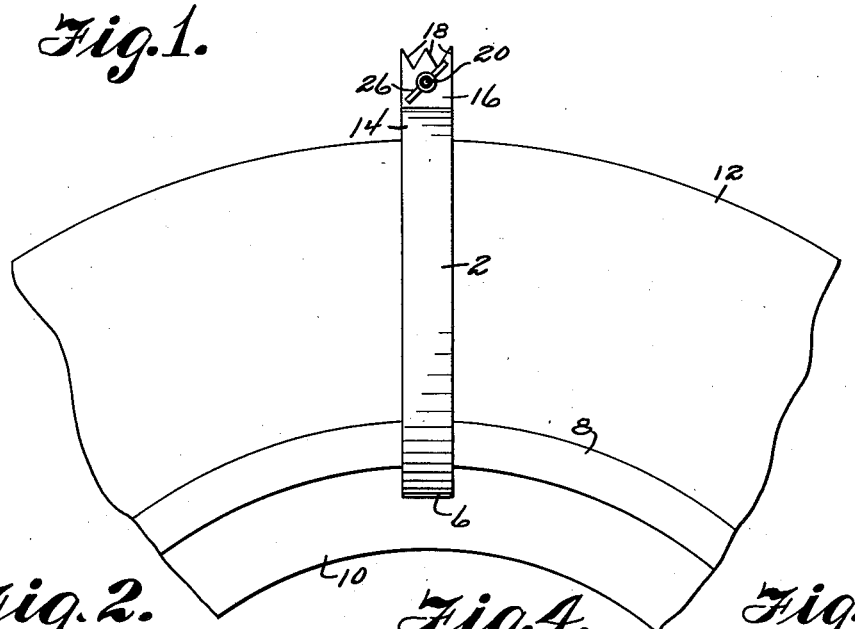
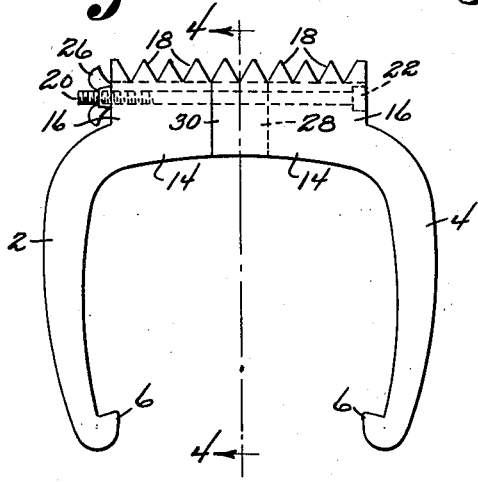
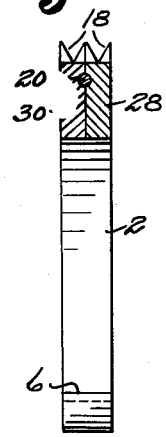
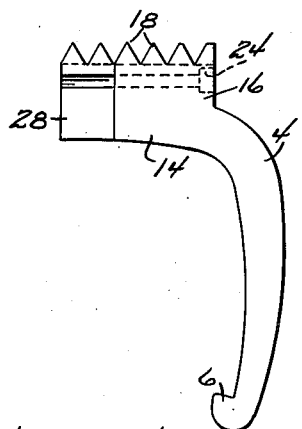
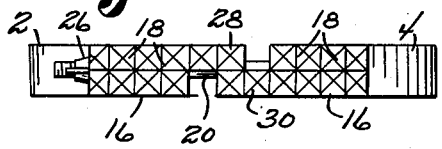
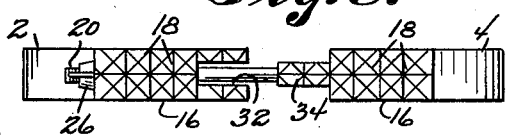
INVENTOR.
George L. Bumbaugh
BY Victor J. Evans & Co.
ATTORNEYS

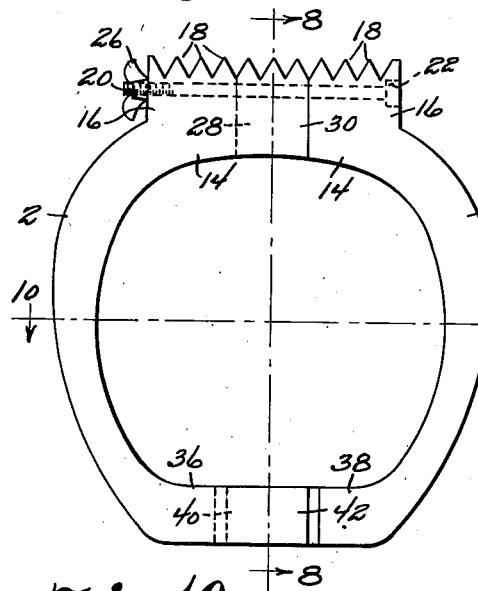
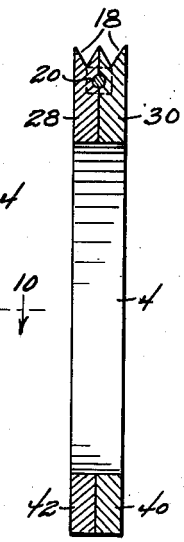
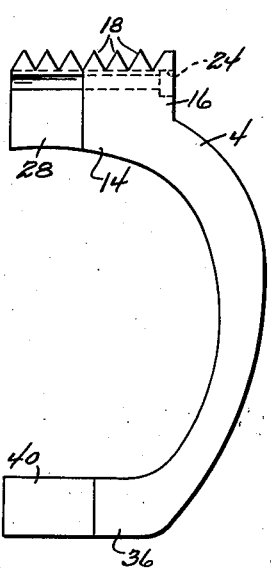
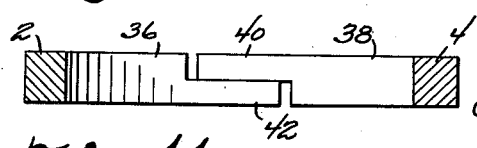
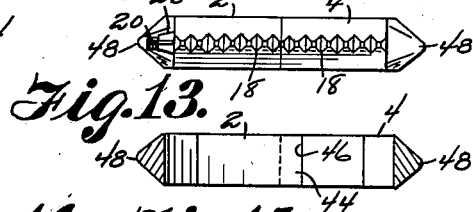
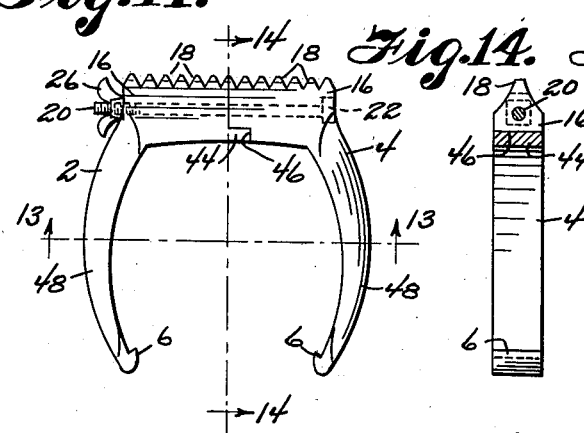
INVENTOR.
George L. Bumbaugh
by Victor J. Evans & Co.
ATTORNEYS

Patented Sept. 30, 1952

2,612,202

UNITED STATES PATENT OFFICE

2,612,202

TRACTION DEVICE

George L. Bumbaugh, Oaklawn, Ill.

Application February 2, 1949, Serial No. 74,181

3 Claims. (Cl. 152—225)

My present invention relates to an improved traction device adapted for use on vehicle wheels and designed for quick and easy attachment and removal and comprises generally a rigid clamp or lug in expansible sections which may be fitted over the tire and rim of the wheel to provide additional traction in emergencies.

The clamp of my invention consists in a pair of mating arms and sections of a base which when bolted together about the tire and rim will secure the clamp rigidly on the tire. The clamp may be mounted and removed in a matter of seconds and does not require the positioning of a strap as is frequently required on the inner side of the wheel. The device is mounted and removed by manipulation solely from the outside of the wheel.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a side elevational view of the device of my invention shown in operating position on a tire and rim.

Fig. 2 is a front elevational view of the clamp.

Fig. 3 is a top plan view of the device showing the sections partially separated.

Fig. 4 is a sectional view at line 4—4 of Fig. 3.

Fig. 5 is a front elevational view of one section.

Fig. 6 is a top plan view of the clamp sections showing a modified form of union therebetween.

Fig. 7 is a front elevational view of a modified device wherein the expansible sections are closed.

Fig. 8 is a sectional view at line 8—8 of Fig. 7.

Fig. 9 is a front elevational view of one section.

Fig. 10 is a sectional view at line 10—10 of Fig. 7.

Fig. 11 is a front elevational view of a further modified form of the device of Figs. 1 through 6.

Fig. 12 is a top plan view thereof.

Fig. 13 is a sectional view at line 13—13 of Fig. 11.

Fig. 14 is a sectional view at line 14—14 of Fig. 11.

Fig. 15 is an end view of one section.

Referring now to the drawings wherein I have illustrated the present preferred embodiment of my invention I preferably employ a pair of L-shaped sections 2 and 4 having inwardly extending hooks 6 to engage the rim 8 of wheel 10 which has a tire 12.

The base portions 14 of the sections 2 and 4 have enlarged bodies 16 which fit together in end to end relationship over the tire. The bodies are formed with surface studs 18 and the bodies 16 are bored to receive the bolts 20 having a squared head 22 seated in the square counterbore 24 of section 4 and the bolt is secured by wing nut 26. It will be noted that the bores have a length several times their diameter to hold the sections against pivoting in axial planes to insure that the hooks 6 are held in engagement with the rim 8.

The sections 2 and 4 have coacting opposed tongues 28 and 30 respectively so that when the sections are clamped together no relative movement between the sections is possible.

Each tongue is approximately half the thickness of the body 16 and extends throughout the full radial thickness thereof. That is, each tongue extends radially from the tire to the outer surface of the lug with no parts of the lug body over or underlying it. This simplifies the construction since the two sections may be identical, eliminates openings which might fill with dirt, and insures a rigid connection of the sections when they are installed.

In Fig. 6 the section 2 is centrally cut out as 32 to receive a central tongue 34 of section 4.

In Figs. 7 through 9, the sections 2 and 4 have no hooks, but have inwardly extending arms 36 and 38 formed with opposed tongues 40 and 42 and the clamp is a closed device so that the arms 36 and 38 may pass through openings in a wheel as in cases of spoke wheels.

In Figs. 11 through 15, the section 2 has a horizontal abutment 44 fitting into the recess 46 of section 4 and each section 2 and 4 has an outer reenforcing rib 48.

From the above description it will be apparent that the traction device of my invention in its primary form and in its modifications will be effective in emergencies to provide traction for vehicles and the traction device may be easily and quickly attached and detached without any tools and without the user soiling his clothes by squeezing in between the tire and fender.

Having thus fully described my invention what I claim as new and desire to secure by Letters Patent is:

1. A traction device for a vehicle wheel having a rim with a tire thereon comprising a pair of detachable curved sections to fit together over the tire, inwardly extending hook portions at the inner ends of the sections to engage the wheel rim to hold the device on the wheel, relatively thick bodies at the outer ends of the sections to fit together in end to end relationship over the tire, thin tongues at the outer ends of the bodies extending throughout the full radial thickness thereof and overlapping over the outer tread portion of the tire, the bodies having aligned bores therein of a length several times their diameter, and a rigid tension fastening extending through the bores to draw the sections together and to hold them against tilting relative to each other.

2. A traction device for a vehicle wheel having a rim with a tire thereon comprising a pair of detachable curved sections to fit together over the tire, relatively thick bodies at the outer ends of the sections and inwardly extending hook portions at the inner ends of the sections to engage the wheel rim to hold the device on the wheel, relatively thick bodies at the outer ends of the sections to fit together in end to end relationship over the tire, thin tongues at the outer ends of the bodies extending throughout the full radial thickness thereof and overlapping over the outer tread portion of the tire, the bodies having openings therethrough and the meeting faces of the tongues having registering grooves therein aligned with the openings, and a rigid tension fastening extending through the openings and grooves to draw the sections together and to hold them against tilting relative to each other.

3. A traction device for a vehicle wheel having a rim with a tire thereon comprising a pair of generally L-shaped curved sections to fit together over the tire, inwardly extending hooks at the inner ends of the sections to hook over the edges of the rim to hold the device on the wheel, thin tongues at the outer ends of the sections extending throughout the full radial thickness of the outer ends thereof and overlapping over the outer tread surface of the tire, the outer ends of the sections having openings therethrough and the meeting faces of the tongues having registering grooves therein aligned with the openings, and a tension fastening extending through the openings and grooves to draw the sections together.

GEORGE L. BUMBAUGH.

REFERENCES CITED

The following references are of record in the file of this patent:

UNITED STATES PATENTS

| Number | Name | Date |
|---|---|---|
| 1,441,645 | Van Orden | Jan. 9, 1923 |
| 1,499,036 | Smith | June 24, 1924 |
| 2,119,447 | Stahl | May 21, 1938 |
| 2,343,131 | Austin | Feb. 29, 1944 |
| 2,437,040 | Prevost | Mar. 2, 1948 |
| 2,474,262 | Linderme | June 28, 1949 |